United States Patent

[11] 3,573,775

| [72] | Inventor | Victor H. Zane |
| --- | --- | --- |
| | | Connersville, Ind. |
| [21] | Appl. No. | 837,482 |
| [22] | Filed | June 30, 1969 |
| [45] | Patented | Apr. 6, 1971 |
| [73] | Assignee | Design and Manufacturing Corporation |

[54] TEMPERATURE INDICATOR CIRCUITS
13 Claims, 3 Drawing Figs.

[52] U.S. Cl. ..................................... 340/227,
340/228, 315/122
[51] Int. Cl. ..................................... G01l 19/12
[50] Field of Search........................... 340/227,
227.1, 223, 253, 256, 285; 315/122; 317/130, 132;
219/500, 506, 487, 494

[56] References Cited
UNITED STATES PATENTS

| 2,021,034 | 12/1931 | Thompson.................... | 250/41.5 |
| 3,128,362 | 5/1962 | Clark et al.................... | 219/20 |

Primary Examiner—John W. Caldwell
Assistant Examiner—William M. Wannisky
Attorney—Melville, Strasser, Foster & Hoffman ABSTRACT: Multistep temperature indicator circuits for electrical appliances and the like comprising electrically actuated indicator means in series circuit with a source of electrical energy. Each of the indicator means in series corresponds to a temperature range within the appliance and will give an indication when its corresponding temperature range obtains within the appliance.

PATENTED APR 6 1971  3,573,775

INVENTOR/S

Victor H. Zane

BY *Melville, Strasser, Foster and Hoffman*
ATTORNEYS

TEMPERATURE INDICATOR CIRCUITS

BACKGROUND OF THE INVENTION

1. Field of the Invention

The invention relates to temperature indicator circuits for an electrical appliance and the like and more particularly to such circuits wherein indicator means such as sources of illumination, each correspond to a respective temperature range within the appliance; each indicator means giving an indication only when its corresponding temperature range obtains within the appliance.

2. Description of the Prior Art

The present invention is applicable to any electrical appliance or other device wherein a separate and distinct indication is desired, corresponding to three (or more) distinct temperature ranges within the appliance or device. For purposes of an exemplary illustration, the temperature indicator circuit of the present invention will be described with respect to an automatic dishwasher. This particular practical application of the circuit of the present invention is not, however, intended to be limiting.

In prior art practice, it is common to have a thermostatically controlled light source which will either go on or off when a predetermined temperature is reached within the appliance. This is found, for example, in electric coffeepots and the like. In a number of modern appliances, there has arisen a need for an indication of more than one temperature or temperature range within the appliance. Recent model dishwashing machines are exemplary of such appliances. They comprise a vat, an access opening to the vat, racks for holding tableware and means for selectively applying to the tableware wash water, rinse water and a drying atmosphere. Such recent model machines are generally provided with cycle selector means whereby the housewife may determine the number of and nature of washing, rinsing and drying steps making up a given cycle. Many of these machines offer a selection of temperatures or temperature ranges, particularly during the washing steps and sometimes during the rinsing and drying steps as well. Heretofore, however, such machines have not had adequate temperature indicating means so that the housewife can determine whether or not the machine is functioning properly and in accordance with the cycle selected. It has also been difficult for the housewife to know if the temperature of the hot water supply is sufficiently high for good dishwashing and sanitizing.

Prior art efforts to provide adequate temperature indicating means have not been thoroughly successful. For example, attempts have been made to provide two or more indicator lights corresponding to two or more temperature ranges within the appliance. Each indicator light has been connected in series with a corresponding thermostatic switch means rated to be actuated when a particular temperature is reached. Such systems, however, have displayed "overlap", i.e. periods of time when more than one of the lights have simultaneously given an indication. This occurs because most of the commercially available thermostatic switch means have a tolerance of up to about plus or minus 5° beyond the rated temperature of actuation. When such an overlap occurs, the housewife is unable to determine which temperature range obtains within the appliance.

The present invention is directed to a temperature indicating circuit having electrically actuated indicator means corresponding to temperature ranges within an appliance and characterized in that only one of the means will give an indication at any given time. Thus, the temperature indicating circuit of the present invention is capable of giving a substantially accurate indication of temperature conditions within the appliance. In addition, the circuit may be expanded so that any desired number of indications can be obtained.

SUMMARY OF THE INVENTION

For purposes of an exemplary showing the circuit of the present invention will be described as a three-step temperature indicator circuit. The indicator means will be described as sources of illumination. It will be understood, however, that the indicator means may be of any suitable electrically actuated type. For example, each indicator could comprise a circuit containing solenoid operated shutter means. In addition, the temperature sensitive switch means will be described as normally open and normally closed thermostatic switches. The term "normally open" relates to that type of thermostatic switch which will remain open until a predetermined temperature is reached, whereupon it will close. Similarly, the term "normally closed" relates to that type of thermostatic switch which will remain closed until a predetermined temperature is reached, whereupon it will open.

It will be understood by one skilled in the art that the thermostatic switches could be replaced by solid-state elements. For example, in an alternating current circuit a temperature sensing resistor, calibrated to specific resistances at given temperatures could be used to trigger a silicon controlled rectifier, a triac or other suitable form of solid-state switch. In a direct current circuit a switching transistor in combination with a silicon controlled switch or switching circuit could be used.

The three-step temperature indicator circuit of the present invention comprises three sources of illumination in series circuit with a source of electrical energy. The first illuminant is shunted by a normally open thermostatic switch adapted to close when a first predetermined temperature is attained within the appliance. The second source of illumination in series is shunted by a low value resistance. The third source of illumination is shunted by a normally closed thermostatic switch, adapted to open at a second and higher predetermined temperature.

When the appliance is turned on, it will generally be at room temperature. When the temperature within the appliance lies within the range between room temperature and that temperature which will cause the normally open thermostat to close, the first source of illumination will be lighted. The second and third sources of illumination will be shunted by the low value resistance and the normally closed thermostatic switch, respectively. When the temperature within the appliance lies between that required to close the normally open thermostatic switch and that required to open the normally closed thermostatic switch, the first and third sources of illumination will be shunted by their respective thermostatic switches, both of which will be closed. Thus, the second illuminant will be lighted. When the temperature within the appliance is equal to or greater than that required to open the normally closed thermostatic switch, the third illuminant will be energized, the first and second illuminants being shunted by the normally open thermostatic switch (now closed) and the low value resistance, respectively.

In a preferred embodiment, the illuminants will comprise neon bulbs, each having a series resistance. When incandescent lamps are used, if they are of the line voltage type, a large wattage shunt resistor will be required. If the incandescent bulbs operate at reduced voltages, a transformer of adequate volt-ampere rating (or other source of reduced voltage such as a voltage dropping resistor) is required. In either case, the source of reduced voltage must be of high capacity to handle the large shunt resistance.

The three-step temperature indicator circuit may be expanded to give any desired number of indications, as will be described hereinafter.

DESCRIPTION OF THE PREFERRED EMBODIMENTS

Figure 1:
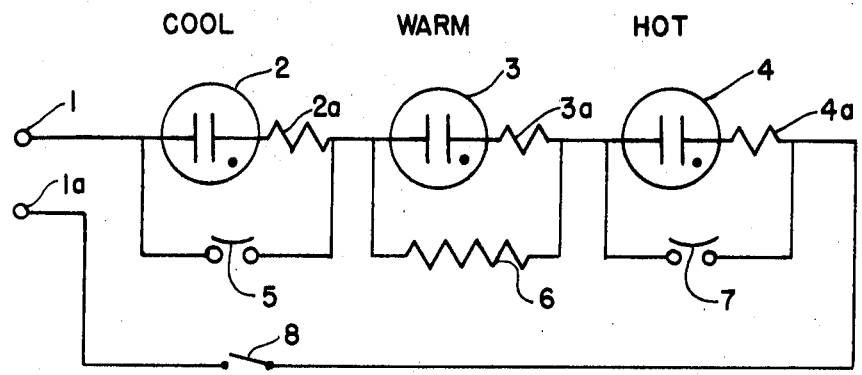
FIG. 1 is a circuit diagram illustrating one embodiment of the three-step temperature indicator of the present invention.

Reference is made to FIG. 1 illustrating a first embodiment of the circuit of the present invention. As shown, the circuit of FIG. 1 is connected at 1 and 1a to a source of electrical energy. The circuit contains three neon indicator lamps 2, 3 and 4. Each of the neon lamps has a series or ballast resistor, as shown at 2a, 3a and 4a, respectively.

The first neon lamp 2 and its series resistor 2a are shunted by a normally open thermostatic switch 5. The second neon lamp 3 and its series resistor 3a are shunted by a low value resistor 6. Finally, the third neon lamp 4 and its series resistor 4a are shunted by a normally closed thermostatic switch 7.

The type of neon lamp used in the circuit does not constitute a limitation on the present invention. The individual neon lamps comprise essentially open circuits when off. At a predetermined voltage level, an ignition point is reached and the individual neon bulbs will fire. When in the on condition, they will conduct current at any voltage higher than the ignition voltage.

When the points 1 and 1a are connected to an ordinary line voltage source (at 117 volts AC) inexpensive, high brightness neon indicator lamps, in common appliance usage today, may be employed. Such lamps generally have an ignition voltage of from about 65 volts to about 75 volts.

A lamp of the type just described is ideally suited for the circuit of FIG. 1 since it generally has a series or ballast resistor. It is necessary to provide such a lamp with a series or ballast resistor to limit the lamp current. Thus the series or ballast resistors 2a, 3a and 4a can be separated (as shown) or can be integral parts of the lamps 2, 3 and 4, respectively.

The shunt resistor 6 may be a portion of that resistance required for current limiting. The shunt resistor 6 must be sufficiently small to permit an acceptable level of light in lamp 2 and lamp 4 when resistor 6 is in series circuit with one or the other of these lamps. The resistor 6, on the other hand, must be sufficiently large to avoid dissipating too much heat; wasting too much power; or requiring a resistor which is physically too large.

The resistor 6 should have a far lower value of resistance than the sum of the resistor 3a and the resistance of the lamp 3 itself. It is well within the skill of one practiced in the art to determine a suitable value for the resistor 6, depending upon the source of electrical energy, the type of neon bulbs used, the value of the ballast resistors and the amount of current desired to pass through the lamps.

The normally open thermostatic switch 5 and the normally closed thermostatic switch 7 may again be of any well known, commercially available type. In the exemplary embodiment set forth, they may be of the bimetallic type. It is generally adequate to mount them by means of brackets or the like adjacent the exterior surface of a vat wall or the inner surface of the liner of the vat closure means. These surfaces closely approximate the temperature conditions within the vat. A single pole—single throw "creep" type thermostat has been used with success. When the thermostat 5 or 7 is intended to activate or deactivate some other operating instrumentality of the dishwasher, in addition to its function with respect to the indicator means, a double throw thermostat may be used.

Thermostatic switches having appropriate actuation temperatures will be elected, depending upon the application to which the circuit of the present invention is put. When applied to a dishwasher, a normally open thermostatic switch, closing at a relatively low temperature (such as about 120° F.) may be used for the thermostatic switch 5. The normally closed thermostatic switch 7 may be selected so as to close at a relatively hotter temperature (i.e. about 140° F.)

Thus, when applied to a dishwasher, the first neon bulb 2 may indicate a "cool" temperature condition up to about 120°. The neon bulb 3 may indicate a "warm" condition from about 120° to 140° F. The neon bulb 4 may indicate a "hot" condition above about 140° F.

The operation of the circuit FIG. 1 may be described as follows. When the appropriate dishwashing cycle has been selected by the housewife, the machine will be actuated, generally by a start button or the like. Actuation of the machine will energize the three-step temperature indicator circuit. The actual means by which the circuit is energized does not constitute limitation on the present invention. For example, it may be energized by a dishwasher start button, by a switch actuated by the dishwasher timer means or in any other well-known and suitable manner. For purposes of an exemplary showing, the means for energizing the circuit is illustrated in FIG. 1 as a simple on-off switch 8.

When the switch 8 is closed and the circuit is energized, neon bulb 2 only will be illuminated (assuming that the temperature conditions within the appliance are at about room temperature). Under these conditions, the normally open thermostatic switch 5 will, in fact, be open. The resistor 6 shunts the "warm" bulb 3 and the normally closed thermostatic switch 7 will be closed, preventing illumination of the "hot" bulb 4.

When a temperature of about 120° F. is reached, the normally open thermostatic switch 5 will close. The normally closed thermostatic switch 7 will remain closed and line voltage will appear across the resistor 6 and the combination of the bulb 3 and the ballast resistor 3a, lighting the "warm" bulb. The bulb 3 will remain lighted until a temperature of about 140° F. is reached. At this point, the normally closed thermostatic switch 7 will open causing illumination of the "hot" bulb 4. When the "hot" bulb is illuminated, the "cool" bulb 2 and "warm" bulb 3 will be shunted by the now closed thermostatic switch 5 and the resistor 6, respectively.

It will be readily understood by one skilled in the art that the three-step temperature indicator circuit will indicate the temperature range within the appliance, whether the temperature therein is increasing or decreasing.

In an exemplary embodiment, wherein the points 1 and 1a are connected to an ordinary line voltage source (at 117 v. AC and the neon lamps 2, 3 and 4 are of the type described above, it has been determined that the best trade-off of lamp current, brightness and lamp life is obtained when the current to any of the lamps is limited by a resistance of about 22,000 ohms. Thus resistor 3a may have a value of 22,000 ohms and the sum of the values of resistor 2a and 6 should also be about 22,000 ohms, as should the sum of the values of resistors 4a and 6.

Resistor 6 must be of sufficiently low value to assure a voltage drop across it of less than the firing voltage for lamp 3 when lamp 2 or 4 is not shunted. Since resistor 6 will draw full input voltage when both thermostats 5 and 7 are closed, it will draw considerable current if it is of low value. Thus a trade-off is necessary, selecting a resistance value which will be acceptable. In the exemplary embodiment resistor 6 may have a value of 7,500 ohms, 3 watts; resistors 2a and 4a may each have a value of 15,000 ohms, one-half watt; and resistor 3a may have a value of 22,000 ohms, one-half watt. Under these circumstances both lamps 2 and 4 in operation have 22,500 (± 20 percent) ohms resistance in series with them while lamp 3 has 22,000 (± 20 percent) ohms in series with it.

It will be understood by one skilled in the art that the amount of current passing through the bulb 2 and the bulb 4, when they are illuminated, will be the same. For bulb 2, the current will be equal to the line voltage divided by the sum of the values of the resistors 2a and 6. For bulb 4, the current will be equal to the line voltage divided by the sum of the values of resistors 4a and 6. For the bulb 3, however, the current will be slightly higher, since it is equal to the line voltage divided by the value of the resistor 3a only. As a result, bulb 3 when illuminated will be slightly brighter than bulb 2 or bulb 4. In instances where slight brightness difference is undesirable, it is within the scope of the invention to increase the value of the ballast resistor 3a or decrease the value of resistors 2a and 4a so as to render the brightness of all three bulbs approximately the same.

Figure 2:
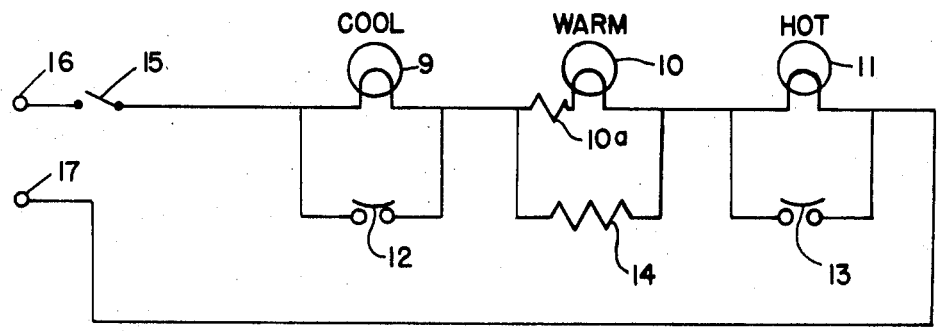
FIG. 2 is a circuit diagram illustrating another embodiment of the three-step temperature indicator.

FIG. 2 illustrates another embodiment of the present invention. In this embodiment, incandescent lamps are used instead of neon bulbs. Thus, three incandescent bulbs 9, 10 and 11 are illustrated, representing the "cool," "warm," and "hot" temperature ranges, respectively. The lamp 9 is shunted by a normally open thermostatic switch 12, equivalent to the thermostatic switch 5 of FIG. 1. The bulb 11 is shunted by a normally closed thermostatic switch 13, equivalent to the thermostatic switch 7 of FIG. 1. The bulb 10, in series with resistor 10a, is shunted by a resistor 14.

For purposes of an exemplary showing, the incandescent lamps 9, 10 and 11 may be of the readily available 14 volt type commonly used in automobiles and appliances. The rated design of 0.27 amps. and 1,500 hours for such lamps may be maintained if a higher circuit voltage is selected and the associated resistances calculated to deliver only rated voltage to the lamps in use. However, since incandescent lamps do not change from dark to bright at the same critical voltage area as do neon lamps, the value of low brightness may become a factor and may require masking of the bulbs with translucent filters, or the like.

In adapting the circuit of FIG. 2 to a particular application (for example as a temperature indicator for a dishwasher) current, voltage and effective lamp resistance must be known for both the high brightness level and the low brightness level desired. These values are readily discernible by one skilled in the art through the use of well-known measurement and calculation methods under laboratory conditions.

In an exemplary embodiment as a temperature indicator for a dishwashing machine, and when lamps of the type described above (rated 14 volts, 0.27 amps.) are used, it has been determined that a suitable high brightness level is obtained at 12 volts and a suitable low brightness level is obtained at 3 volts. It has further been determined that the lamp current is 0.23 amps. at 12 volts.

In the embodiment of FIG. 2, the points 16 and 17 are connected to a source of electrical energy rated at 14 volts. The lamps 9, 10 and 11 are identical. Thus, the resistor 10a will be chosen to give the desired high brightness level to lamp 10. This requires that the resistor 10a reduce the voltage by 2 volts in order to limit lamp 10 to 12 volts. The effective resistance for lamp 10 is readily calculated and is 51.8 ohms. Armed with this value, the value of resistor 10a may be readily calculated and will be found to be 8.6 ohms.

Resistor 14 is selected to be of a value such that when lamps 9 or 11 are illuminated, they will have an equivalent high brightness level to lamp 10 when it is illuminated. This requires that when lamp 9 or lamp 11 is illuminated the voltage drop across the series branch containing lamp 10 and resistor 10a and the shunt connected resistor 14 be approximately equivalent to the voltage drop across resistor 10a alone when lamp 10 is illuminated. With this in mind, the value of resistor 14 may be readily calculated to be 10 ohms.

The operation of the embodiment of FIG. 2 is substantially the same as that described with respect to the embodiment of FIG. 1. For example, if the thermostatic switch 12 is again adapted to close at about 120° F. and if the thermostatic switch 13 is adapted to open at about 140° F., the circuit will again indicate a "cool" range up to about 120° F., a "warm" range from about 120° F. to about 140° F. and a "hot" range above about 140° F. When the temperature within the appliance lies below 120° F., the thermostatic switch 12 will open and the "cool" incandescent lamp 9 will be lit. The "warm" incandescent lamp 10 will be shunted by the resistor 14 and the "hot" incandescent lamp 11 will be shunted by the thermostatic switch 13 which will be closed. When the temperature within the appliance lies between about 120° F. and 140° F., both thermostatic switches 12 and 13 will be closed and only the "warm" lamp 10 will be illuminated. When the temperature is above about 140° F., the normally open thermostatic switch 12 will be closed so that the "cool" lamp 9 and the "warm" lamp 10 will be shunted by the thermostatic switch 12 and the resistor 14, respectively. The normally closed thermostatic switch 13 will be open with the result that the "hot" lamp 11 will be illuminated.

Again, for purposes of an exemplary showing, the circuit of FIG. 2 is provided with means for energizing the circuit, represented by switch 15.

It will be understood by one skilled in the art that if a two-step temperature indicating means is desired, this can be achieved in the circuit of FIG. 1 simply by removing from the circuit lamp 4, resistor 4a and thermostatic switch 7. Similarly, a two-step indicator circuit could be derived from the circuit of FIG. 2 by eliminating from that circuit bulb 11 and thermostatic switch 13.

Figure 3:
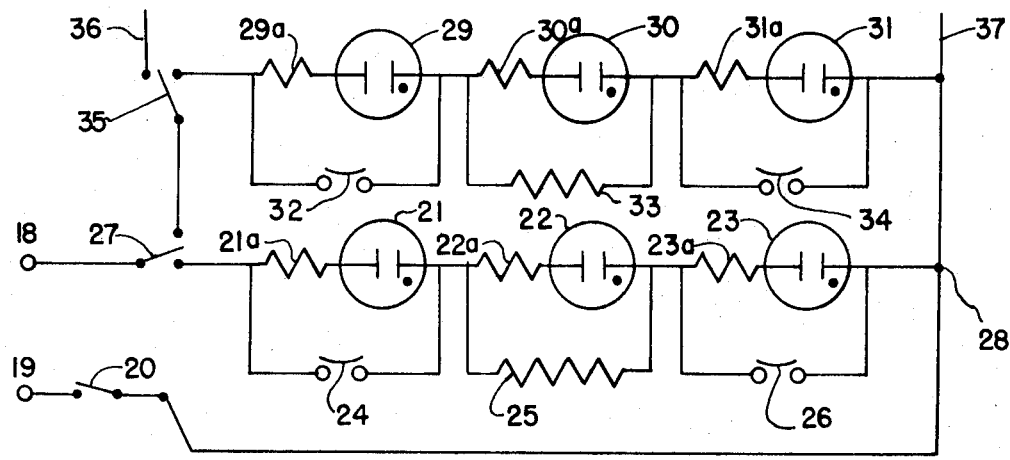
FIG. 3 is a circuit diagram illustrating an expanded form of the temperature indicator of the present invention.

FIG. 3 illustrates the manner in which the circuit of FIG. 1 may be expanded to give more than three temperature indications. In the circuit of FIG. 3, points 18 and 19 are connected to a source of line voltage. Means for energizing the circuit are represented by switch 20. Neon bulbs 21, 22 and 23 and their series resistors 21a, 22a and 23a are equivalent to bulbs 2, 3 and 4 and resistors 2a, 3a and 4a, respectively, in FIG. 1. Similarly, thermostatic switch 24, shunt resistor 25 and thermostatic switch 36 are equivalent to thermostatic switch 5, shunt resistor 6 and thermostatic switch 7 of FIG. 1.

Switch 27 may be of any suitable type, as for example a snap action, double-throw thermostatic switch. When switch 27 is in the position shown, the operation of FIG. 3 will be in every way identical to that of FIG. 1, thermostatic switch 24 being adapted to close at about 120° F. and thermostatic switch 26 being adapted to open at about 140° F.

FIG. 3 illustrates an additional parallel branch, connected at one end to the other pole of thermostatic switch 27 and at the other end to the previously described circuit at 28. The last mentioned branch contains lamps 29, 30 and 31 in series, each having a series resistor 29a, 30a and 31a. Resistor 29a and lamp 29 are shunted by a normally open thermostatic switch 32. Resistor 30a and lamp 30 are shunted by resistor 33 and resistor 31a and lamp 31 are shunted by normally closed thermostatic switch 34. When the thermostatic switch 27 changes from its position shown in FIG. 3 to its other pole position, the circuit branch containing lamps 21, 22 and 23 will be disconnected and the circuit branch containing lamps 29, 30 and 31 will function in a manner identical to that described with respect to the previously mentioned branch or the circuit shown in FIG. 1.

For purposes of an exemplary showing, the switch 27 will be assumed to trip from the position shown in FIG. 3 to its other position at about 160° F. Similarly, thermostatic switch 32 will be assumed to remain open up to about 180° F., while thermostatic switch 34 will be assumed to close at about 200° F.

With these values in mind, if the appliance starts out at room temperature, switch 27 will be in the position shown and lamp 21 will be illuminated. Lamp 21 will remain illuminated until the temperature reaches 120° F. A temperature range of 120° F. to 140° F. will be indicated by lamp 22 and a temperature range of 140° F. to 160° F. will be indicated by lamp 23.

At 160° F. the switch 27 will trip and lamp 29 will be illuminated. Lamp 29 will indicate a temperature range of from 160° F. to 180° F. A temperature range of 180° F. to 200° F. will be indicated by lamp 30. Finally, a temperature range of 200° F. and up will be indicated by lamp 31.

As indicated above, lamp 23, series resistor 23a and thermostatic switch 26 may be removed from the circuit in order to provide a five-step indicator means. In the same manner, lamp 31 resistor 31a and thermostatic switch 34 could be removed so as to provide a four-step indicator means.

If more indications are required than the six shown in FIG. 3, an additional switch means 35 may be provided which, at a predetermined temperature in excess of 200° will snap to its second position energizing yet another branch diagrammatically indicated by leads 36 and 37. In the same manner indicated above, this additional branch may contain means for two or three more indications.

Thus it will be seen that through the use of switches such as those shown at 27 and 35 in FIG. 3, sets of two or three indicating means or two and three indicating means may be "stacked" to give any desired number of indications. It will be understood that the circuit of FIG. 2 may be similarly expanded.

Modifications may be made in the invention without departing from the spirit of it.

I claim:

1. A temperature indicator circuit for electrical appliances and the like comprising at least a first and a second electrically actuated indicator means connected in series to a source of electrical energy, said first indicator means being shunted by a normally open temperature sensitive switch means adapted to remain open until a first predetermined temperature is reached whereupon it will close, said second indicator means being shunted by a low value resistance and means for energizing said circuit whereby said first indicator means will be energized until said first predetermined temperature is reached whereupon said normally open temperature sensitive switch means will close and said second indicator means will be energized.

2. The circuit of claim 1 including a third indicator means in series with said first and second indicator means, said third indicator means being shunted by a normally closed temperature sensitive switch means adapted to remain closed until a second predetermined temperature is reached whereupon it will open, whereby said first indicator means only will give an indication until said first predetermined temperature is reached, whereupon said normally open temperature sensitive switch means will close and said second indicator means only will give an indication until said second predetermined temperature is reached, whereupon said normally closed temperature sensitive switch means will be opened and said third indicator means only will give an indication.

3. The circuit claimed in claim 1 wherein said first indicator means comprises a first neon bulb and a first series resistor and said second indicator means comprises a second neon bulb and a second series resistor.

4. The circuit claimed in claim 1 wherein said first indicator means comprises a first incandescent bulb and said second indicator means comprises a second incandescent bulb and a series resistor.

5. The circuit claimed in claim 2 wherein said first, second and third indicator means comprise respectively a first neon bulb and a first series resistor, a second neon bulb and a second series resistor and a third neon bulb and a third series resistor.

6. The circuit claimed in claim 2 wherein said first, second and third indicator means comprise respectively a first incandescent bulb, a second incandescent bulb and series resistor, and a third incandescent bulb.

7. The circuit claim in claim 3 wherein said first and second neon bulbs are identical, the value of said second series resistor when said second bulb is lit being substantially equal to the combined values of said first series resistor and said shunt resistor when said first bulb is lit.

8. The circuit claimed in claim 4 wherein said first and second lamps are identical, said series resistor having a value such as to produce the desired brightness in said second lamp when it is lit, said shunt resistor having a value such that when said first lamp is lit it will have an equivalent brightness to said brightness of said second lamp and the voltage drop across said second lamp, said series resistor and said shunt resistor will be approximately the same as the voltage drop across said series resistor when said second lamp is lit.

9. The circuit claimed in claim 5 wherein said first, second and third neon bulbs are identical, the value of said first series resistor when said first bulb is lit is equal to the value of said third series resistor when said third bulb is lit, the value of said second series resistor when said second bulb is lit is equal to the sum of the values of said first series resistor and said shunt resistor when said first bulb is lit.

10. The circuit claimed in claim 6 wherein said first, second and third incandescent lamps are identical, said series resistor having a value such as to produce the desired brightness in said second lamp when it is lit, said shunt resistor being so chosen that when said first or third lamps are lit they will have an equivalent brightness to said brightness of said second lamp and the voltage drop across said second lamp, said series resistor and said shunt resistor will be approximately the same as the voltage drop across said series resistor when said second lamp is lit.

11. A temperature indicator circuit for appliances and the like comprising at least two sets of series connected indicator means, said sets being arranged to be energized in sequence, each of said sets comprising a first indicator means shunted by a normally open temperature sensitive switch means adapted to remain open until a predetermined temperature for said last mentioned switch means is reached whereupon it will close, and a second indicator means shunted by a low value resistor, means for energizing said circuit and a temperature sensitive connecting switch means between each set in said sequence, each of said connecting switch means connecting the first in said sequence of the sets between which it is located to a source of electrical energy until a predetermined temperature for said connecting switch means is reached whereupon it will disconnect said last mentioned set from said source and connect to said source the second in said sequence of the sets between which it is located, said predetermined temperature of said connecting switch means lying between said predetermined temperatures for said normally open temperature sensitive switch means in the sets between which said connecting switch means if located, the number of said connecting switch means being one less than the total number of said sets in said sequence.

12. The structure claimed in claim 11 wherein each of said sets contains a third indicator means shunted by a normally closed temperature sensitive switch means adapted to remain closed until a predetermined temperature for said last mentioned switch means is reached.

13. A temperature indicator circuit for appliances and the like comprising at least two sets of series connected indicator means, said sets being arranged to be energized in sequence, at least one of said sets comprising a first indicator means shunted by a normally open temperature sensitive switch means adapted to remain open until a predetermined temperature for said last mentioned switch is reached whereupon it will close, and a second indicator means shunted by a low value resistor, at least one of said sets comprising a first indicator means shunted by a normally open temperature sensitive switch means adapted to remain open until a predetermined temperature for said last mentioned switch is reached whereupon it will close, a second indicator means shunted by a low valve resistor and a third indicator means shunted by a normally closed temperature sensitive switch means adapted to remain closed until a predetermined temperature for said last mentioned switch means is reached whereupon it will open, means for energizing said circuit and a temperature sensitive connecting switch means located between each set in said sequence, each of said connecting switch means connecting the first in said sequence of the sets between which it is located to a source of electrical energy until a predetermined temperature for said connecting switch means is reached whereupon it will disconnect said last mentioned set from said source and connect to said source the second in sequence of the sets between which it is located, the number of said connecting switch means being one less than the total number of said sets in said sequence.